United States Patent [19]

Thompson

[11] 4,319,086
[45] Mar. 9, 1982

[54] VOICE SWITCH FOR HANDS FREE COMMUNICATION APPARATUS

[75] Inventor: James L. E. Thompson, Nepean, Canada

[73] Assignee: Northern Telecom Limited, Montreal, Canada

[21] Appl. No.: 162,327

[22] Filed: Jun. 23, 1980

[30] Foreign Application Priority Data

Apr. 30, 1980 [CA] Canada ................................. 350901

[51] Int. Cl.³ .............................................. H04M 9/10
[52] U.S. Cl. ................................................ 179/1 HF
[58] Field of Search ................. 179/1 HF, 1 VC, 1 P, 179/1 SW, 81 B; 328/137, 154

[56] References Cited

U.S. PATENT DOCUMENTS

| | | | |
|---|---|---|---|
| 4,002,854 | 1/1977 | Penrose | 179/81 B |
| 4,051,325 | 9/1977 | Mafune et al. | 179/1 HF |
| 4,115,658 | 9/1978 | Williams | 179/1 HF |

*Primary Examiner*—Bernard Konick
*Assistant Examiner*—J. A. Popek
*Attorney, Agent, or Firm*—J. E. Moorhouse

[57] ABSTRACT

First syllable clipping typically associated with simple control circuits in hands free telephony, is substantially reduced by using a voice switch with non-linear response characteristics. The voice switch includes field effect devices in transmit and receive variolossers for providing hands free operation in communication apparatus. The field effect devices are non-linear in their response to a control voltage, and are thus controllable to provide rapid switching from an idle mode of operation, to an opposite mode of operation. The control circuit generates a control signal for operating the voice switch in response to a.c. signals in a microphone circuit connected with a transmit path and in response to a.c. signals in a loudspeaker circuit connected with a receive path. A circuit including another field effect device similar to the above mentioned field effect devices, is responsive to the control signal for generating a control voltage for controlling attenuation introduced in the transmit and receive paths by the respective variolossers. This circuit generates the control voltage having first and second limits. The first limit corresponds to operation of the voice switch in a quiescent or idle state and is adjusted with respect to operating temperatures such that the field effect devices are maintained at or near a threshold of conductance. As a result, the variolossers are hyper-responsive to excursions in the control voltage from the first limit toward the second limit, substantially reducing first syllable clipping.

6 Claims, 3 Drawing Figures

VOICE SWITCH FOR HANDS FREE COMMUNICATION APPARATUS

The invention relates generally to hands free voice communication apparatus and more particularly to a voice switch for providing hands free transmit and receive modes of operation in a loudspeaking voice communications apparatus.

Improvements in the operational characteristics of hands free telephony have typically been attained at the expense of circuit complexity. U.S. Pat. No. 3,889,059 entitled "Loudspeaking Communication Terminal Apparatus And Method of Operation", issued to myself, Wallace Eugene Clarke and James Gale on June 10, 1975, describes one example of a relatively complex apparatus. Hands free telephone apparatus substantially as described in the patent are currently marketed under the trade mark *COMPANION, as an add-on for use in combination with typical telephone station sets. The operating characteristics of *COMPANION have earned acceptance for it by various operating telephone companies in spite of its high cost of manufacture and consequent high purchase price. Some of the elements contributing to this high cost are a sophisticated voice switch including a complex control circuit and linearly responsive transmit and receive attenuator circuits.
*Trademark Historically, hands free voice communication apparatus have been designed to idle in the receive mode of operation. The apparatus switches to the transmit mode of operation only in the event that transmit a.c. signals in a microphone circuit exceed received a.c. signals in a loudspeaker circuit. This method of operation can be achieved with a relatively simple control circuit typically including transmit and receive signal rectifiers connected to a comparator which generates a control signal for operating transmit and receive attenuators in a complementary manner. However, this method of operation has two disadvantages, one being that the transitions to the transmit mode are not fast enough to consistently avoid clipping first syllables of speech signals in the microphone circuit, and the other being that monotonous background noise signals picked up by the microphone circuit tend to cause the apparatus to improperly switch to the transmit mode in the absence of speech signals. The second disadvantage is typically overcome by using the noise signal from the microphone circuit to further bias the operation of the apparatus toward the receive mode. However, this adds to the problem of first syllable clipping when switching into the transmit mode of operation. All of these disadvantages are substantially elliminated in the apparatus described in the previously mentioned U.S. Pat. No. 3,889,059 through the use of complex control circuitry which provides a third or intermediate idle mode of operation and dynamically alterable transition times between the three modes of operation. As before mentioned, the circuitry contributes significantly to the cost of manufacture.

A voice switch as provided by the present invention includes variolosser circuits in transmit and receive paths in a loudspeaking hands free communication apparatus. Relatively inexpensive field effect devices ae controlled to provide switchable attenuation in the variolosser circuits. Inherent temperature instability of the field effect devices is compensated for so that non-linear device response to a controlling voltage is advantageously utilized to obtain desirable switching characteristics between receive and transmit modes of operation. The voice switch is thereby adapted to be hyper-responsive to any excursion of a control signal away from the receive mode of operation. Consequently, the disadvantage of first syllable clipping normally associated with the operation of the more simple examples of control circuits is substantially reduced.

The invention provides a voice switch for operating a communication apparatus in hands free transmit and receive modes. The communication apparatus includes a microphone circuit, a loudspeaker circuit, and a control circuit for generating a control signal having first and second signal states corresponding to the modes of operation for controlling the voice switch circuit. The voice switch circuit comprises a first field effect device connected with the transmit signal path to conduct a.c. signals according to a control voltage to provide a variable attenuation function. A second field effect device is connected with the receive signal path to conduct a.c. signals according to the control voltage to provide a variable attenuation function. The impedance characteristics of the field effect devices are substantially identical. A circuit responsive to the control signal, generates the control voltage between first and second limits and includes a voltage divider having a voltage tap at a junction between a resistance and a third field effect device connected to be biased in operation by a potential developed at the voltage tap, said potential corresponding to a first limit. The impedance characteristic of the third field effect device is such that its operating characteristics vary with changing operating temperatures in a manner substantially identical to that of the first and second field effect devices. The control voltage, when at the first limit is thereby varied in accordance with the variations in the operating temperature to maintain the first and second field effect devices substantially at a threshold of conductance throughout a range of operating temperatures.

In one example of the voice switch, the first, second and third field effect devices are provided by enhancement operated field effect transistors each with source, drain, and gas electrodes. The first field effect transistor is connected via its source and drain electrodes in series with the transmit path. The second field effect transistor is connected via its source and drain electrodes in shunt with the receive path. The first limit of the control voltage corresponds to a threshold of conductance in the first and second field effect transistors and a second limit of the control voltage corresponds to a substantial enhancement of conductance in said first and second field effect transistors. In operation, the series and shunt connection of the first and second field effect transistors provide for a disproportionately large transition from the receive mode of operation toward the transmit mode of operation with a partial transition in the control voltage from the first limit toward the second limit.

The invention also provides a method for operating a hands free communication apparatus having variable resistance means provided by field effect devices in transmit and receive paths and a control circuit for generating a control signal in response to a.c. signals in a microphone circuit connected to the transmit path, and in response to a.c. signals in a loudspeaker circuit connected to the receive path. The method includes the steps of applying an energizing voltage for operating the handsfree communication apparatus, generating a transmit signal state of the control signal corresponding to a transmit mode of operation, and a receive signal state corresponding to a receive mode of operation, wherein one of said signal states also corresponds to an idle mode of operation in the absence of significant a.c. signals in the microphone and loudspeaker circuits. The method is characterized by the further steps of conducting a current through a voltage divider, which includes a field effect device with thermal operating characteristics substantially identical to thermal operating characteristics of the field effect devices in said resistance means, to develop a voltage at a first limit corresponding substantially to a threshold of conduction in said field effect devices; and controlling the field effect devices in the resistance means with said developed voltage to effect a mode of operation common with the idle mode and alternately controlling the field effect devices with a voltage at a second limit substantially corresponding to said energizing voltage to effect an opposite mode of operation, whereby transitions from the idle mode of operation in the direction of the opposite mode of operation are rapid with respect to transitions returning from said opposite mode of operation.

An example embodiment of a voice switch in combination with a telephone apparatus will now be described with reference to the accompanying drawings in which.

Figure 1:
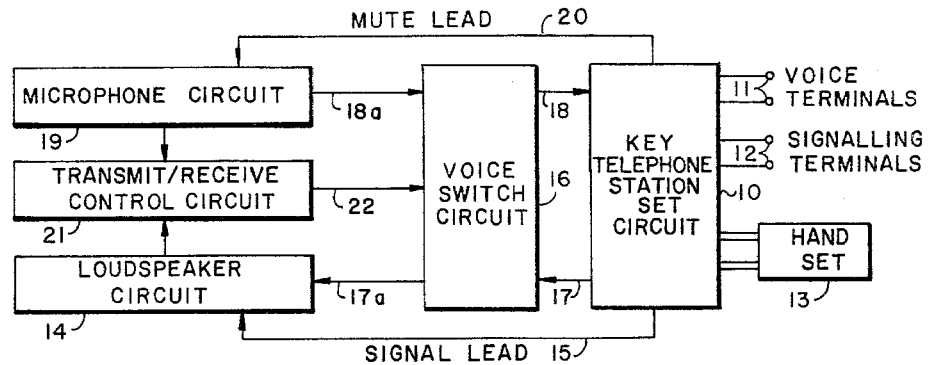
FIG. 1 is a block schematic diagram of an example of a typical hands free telephone apparatus.

In FIG. 1, a key telephone station set circuit 10 is connected to voice terminals 11, signalling terminals 12, a handset 13 and a loudspeaker circuit 14. In operation with the handset 13, voice signals are coupled between the handset 13 and a transmission line, not shown, via the key telephone station set circuit 10 and the voice terminals 11. Signalling signals, for example key telephone system ringing signals, are received at the signalling terminals 12. The key telephone station set circuit 10 responds to the ringing signals by supplying a corresponding voice band signal to the loudspeaker circuit 14, via a signal lead 15, for audible response by the loudspeaker circuit 14.

Hands free voice communication is provided by a voice switch 16, connected by a receive path 17 and 17a between the key telephone station circuit 10 and the loudspeaker circuit 14, and connected by a transmit path 18 and 18a between the key telephone station set circuit 10 and a microphone circuit 19. The microphone circuit 19 is also connected by a mute lead 20 controlled by the key telephone station set circuit 10. A transmit/receive control circuit 21 is connected by a lead 22 to control the voice switch circuit 16 in response to a.c. signals receivead by the transmit/receive control circuit 21 from the microphone circuit 17 and from the loudspeaking circuit 14.

A hands free communication apparatus as briefly described above, typically operates to provide at any one instant a one-way communication path between a user and the voice terminal 11. In a quiescent state, that is when there are no significant speech envelope signals detected by the transmit/receive control circuit 21, the voice switch is controlled to operate in a receive mode. In the receive mode, little or no attenuation is inserted in the receive path 17 and 17a while maximum attenuation is inserted in the transmit path 18 and 18a. The receive mode is also maintained in the event that the signals in the loudspeaking circuit 14 exceed the signals in the microphone circuit 19. Alternately, when speech envelope signals in the microphone circuit 19 exceed signals in the loudspeaker circuit 14, the transmit/receive control circuit 21 causes the voice switch circuit 16 to operate in a transmit mode. In the transmit mode, little or no attenuation is inserted in the transmit path 18 and 18a while maximum attenuation is inserted in the receive path 17 and 17a. This type of operation requires only relatively simple circuitry, not shown, to provide for the transmit/receive control circuit. Various examples of control circuitry are familiar to persons of normal skill in handsfree communication apparatus and typically includes a comparator circuit, not shown, for generating a binary like control signal for controlling the voice switch 16 in response to rectified samples of a.c. signals in the loudspeaker circuit 14 and the microphone circuit 19 respectively. A primary disadvantage of this type of operation is generally described as first syllable clipping. First syllable clipping frequently occurs during transitions from the receive mode of operation to the transmit mode of operation.

Figure 2:
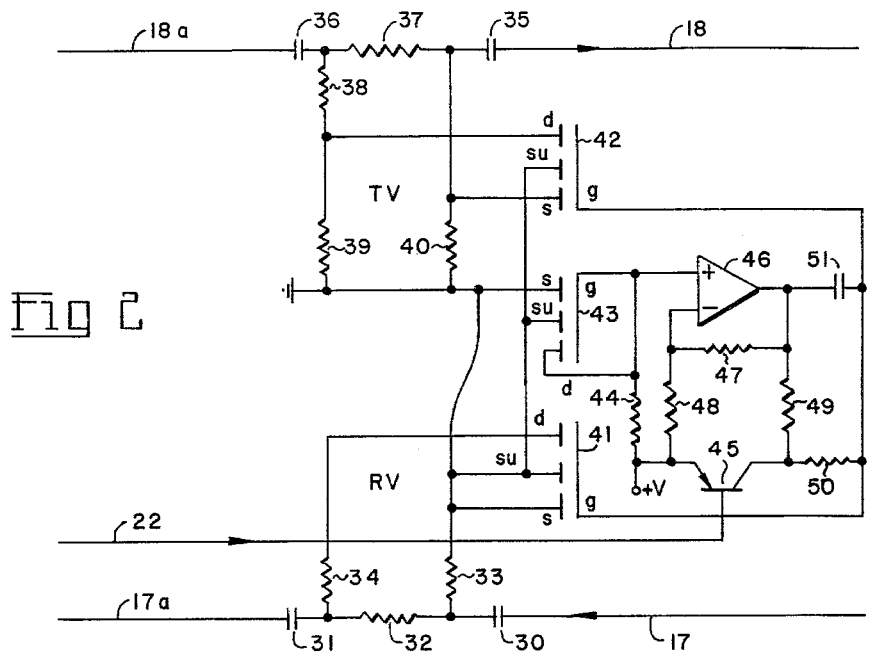
FIG. 2 is a schematic diagram of a voice switch in accordance with the invention for use in the apparatus in FIG. 1.

A voice switch which substantially reduces first syllable clipping is illustrated in FIG. 2. In FIG. 2, a receive variolosser, generally at RV, is connected in shunt with the receive path 17 and 17a via capacitors 30 and 31. The receive variolosser includes resistances 32 connected in series between the capacitors 30 and 31, and an enhancement mode field effect transistor 41 having a source electrode s and a substrate electrode su both connected to ground, a drain electrode d connected in series with a resistance 34 to the junction between the capacitor 31 and the resistance 32, and a gate electrode g. A transmit variolosser, generally at TV, is connected in series with the transmit path 18 and 18a via capacitors 35 and 36. The transmit variolosser includes a resistance 37 connected in series between the capacitors 35 and 36, and an enhancement mode field effect transistor 42 having a source electrode s connected to the junction of the resistance 37 and the capacitor 35, a drain electrode d connected in series with a resistance 38 to the junction of the resistance 37 and the capacitor 36 a substrate electrode su connected to ground, and a gate electrode g.

In addition, a resistance 39 is connected between ground and the junction of the resistance 38 and the drain electrode d of the field effect transistor 42, and a resistance 40 is connected between ground and the junction of the resistance 37 and the capacitor 35. Also a resistance 33 is connected between ground and the junction between the capacitor 30 and the resistance 32. The value of these resistances 33, 39 and 40 are relatively high, as they serve solely to provide ground reference to prevent the respective variolosser from floating.

The remainder of the circuitry in FIG. 2 is concerned with generating a control voltage for operating the transmit and receive variolossers. An enhancement mode field effect transistor 43 includes source and substrate electrode s and su connected to ground, and drain and gate electrodes d and g connected together and in series with a resistance 44 to a power terminal +V. The combination of the field effect transistor 43 and the resistance 44 provide a voltage divider structure having a voltage tap at the junction of the resistance 44 and the drain and gate electrodes. The field effect transistors 41, 42, and 43 are substantially identical devices and preferably are resident in a common substrate. A PNP transistor 45 includes an emitter electrode connected to the power terminal +V, a collector electrode, and a base electrode connected to the lead 22. A differential amplifier 46 and resistances 47, 48 and 49 provide a voltage follower circuit. A non-inverting input of the differential amplifier 46 is connected to the junction of the drain and gate electrodes of the field effect transistor 43. The resistance 47 is connected between the output and an inverting input of the amplifier 46. The resistance 48 is connected between the power terminal +V and the junction of the inverting input of the amplifier 46 and the resistance 47. The resistance 49 is connected between the output of the amplifier 46 and the collector electrode of the transistor 45. A resistor 50 is connected in series with the collector of the transistor 45 to the gate electrodes of the field effect transistor 41 and 42. A capacitor 51 is connected between the output of the amplifier 46 and the just mentioned gate electrodes.

Figure 3:
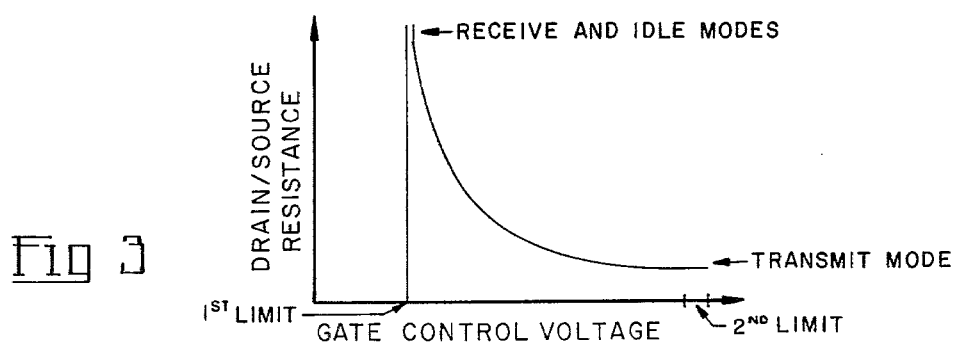
FIG. 3 is a graphic representation of impedance characteristics of field effect devices used in the voice switch of FIG. 2.

In operation, with the transistor 45 biased OFF by the control signal on the lead 22, the voice switch is in the receive mode. Current is conducted via the resistance 44 and the field effect transistor 43 to develop a first control voltage limit at the junction of these elements. The first limit varies with operating temperature according to the conduction characteristics of the field effect transistor 43. When the temperature is low the first limit is high and when the temperature is higher the first limit is lower. The differential amplifier 46 functions as a voltage follower to provide the lower limit potential plus an offset potential at the gate electrodes of the field effect transistors 41 and 42. The offset potential is determined by the ratio of the values of the resistances 47 and 48. The value of the resistance 44 is chosen in combination with the characterized impedances of the field effect transistors such that the first limit potential corresponds to a threshold of conduction as illustrated in FIG. 3, over a range of operating temeratures. Under these conditions, the field effect transistors 41 and 42 each exhibit high impedance to a.c. signals. Thus, the transmit variolosser attenuation is high, being predominantly determined by the value of the resistance 37 shunted by the value of the resistance 40. The attenuation of the receive variolosser is correspondingly low, being predominantly determined by the value of the resistance 32.

In the case where the transistor 45 is biased ON by the control signal on the lead 22, the voice switch is in the transmit mode. Current is conducted by the transistor 45 to generate the control voltage at a second limit, nearly that of the voltage at the power terminal +V. In this case the transmit variolosser attenuation is relatively low, being predominantly determined by the value of the resistance 38 and to a lesser extent by the series ON impedance of the field effect transistor 42. The value of the resistance 37 is relatively high, having no significant effect. The receive variolosser attenuation is correspondingly high, being predominantly determined by the value of the resistance 34 and to a lesser extent by the series ON impedance of the field effect transistor 41, together acting in shunt with the value of the resistance 32.

Referring to FIG. 3, gate control voltage is represented along a horizontal axis of the graph and resistance is represented along a vertical axis of the graph. The first limit is identical on the horizontal axis and corresponds to the receive and idle modes of operation. The area of the second limit is indicated on the horizontal axis corresponds to the transmit mode of operation. Typical resistance between the source and drain electrodes of the enhancement mode field effect transistors 41, and 42 is represented with respect to the control voltage along a curve extending between the first and second limits. From the graph, it is seen that a disproportionately large reduction of resistance is achieved with respect to a small excursion of the gate control voltage from the first limit toward the second limit as compared to a full transition to the second limit. However, to consistantly obtain this advantageous operation the first limit potential is generated, as previously described, such that it closely follows the temperature-induced variations in the threshold of conductance of the field effect devices 41 and 42.

A voice switch generally as described in the foregoing is particularly advantageous when used in combination with a transmit/receive control circuit which, in operation, idles in one of the transmit or receive modes. In such a switch, the variolossers are provided with field effect devices having non-linear impedance characteristics, similar to those illustrated in FIG. 3, such that, in the idle mode, the devices are biased OFF just on the edge of becoming conductive. In this state, the field effect devices are disproportionally sensitive to any excursion of the control voltage toward the opposite mode of operation. This, combined with the typical response of the transmit/receive control circuit, has the effect of rendering the hands free communication apparatus hyper-responsive to stimuli in the direction opposite to the idle mode and so reduces the problem of first syllable clipping. In the instant embodiment switching between the modes of operation is smoothed by the capacitor 51 and the resistances 49 and 50, to avoid audible clicks or thumps. In the example embodiment, the time constant of this combination was chosen to be between 100 and 150 milliseconds, and about one tenth of this time constant results from the combination of the capacitor 51 and the resistance 50. The voice switch of the invention may be realized with "off the shelf" components. For example, the field effect transistors may be purchased as a CMOS integrated circuit number 4007, available from various component manufacturers. The variolossers using these field effect transistors have been found to operate satisfactorily with a.c. signals of up to about 150 millivolts of peak to peak amplitude. The fact that these devices are highly temperature sensitive is compensated for by the voltage divider circuit (44, 43), and the voltage follower (46, 47, 48) which generate the first voltage limit with a temperature variation of between −3.5 and −4.0 millivolts per degree Celcius.

What is claimed is:

1. A voice switch circuit for providing hands free transmit and receive modes of operation in a communication apparatus wherein the communication apparatus includes a microphone circuit, a loudspeaker circuit, a transmit signal path for passing a.c. signals from the microphone circuit to an output, a receive signal path for passing a.c. signals from an input to the loudspeaker circuit, and a control circuit for generating a control signal having first and second signal states corresponding to the modes of operation for controlling the voice switch circuit, in response to the a.c. signals in the microphone circuit and the a.c. signals in the loudspeaker circuit, the voice switch circuit comprising:

a first field effect device connected to conduct a.c. signals in accordance with a control voltage to provide a variable attenuation function in said transmit signal path, a second field effect device connected to conduct a.c. signals in accordance with the control voltage to provide a variable attenuation function in said receive signal path each of said field effect devices having substantially identical impedance characteristics;

means for generating said control voltage having first and second limits in response to said control signal, and including a voltage divider having a voltage tap at a junction between a first resistance and a third field effect device connected to be biased in operation by a potential developed at the voltage tap, said potential corresponding to said first limit, the third field effect device having an impedance characteristic varying with operating temperature substantially identical to those of the first and second field effect devices, whereby said first limit of the control voltage is varied in accordance with variation in the operating temperature to maintain the impedance of the first and second field effect devices substantially at a threshold of conductance throughout a range of the operating temperature.

2. A voice switch as defined in claim 1 wherein said first, second and third field effect devices comprise field effect transistors all residing in a semiconductor substrate.

3. A voice switch as defined in claim 1 wherein the first, second and third field effect devices are enhancement operated field effect transistors with source, drain and gate electrodes, the first field effect transistor being connected via said source and drain electrodes in series with said transmit path, the second field effect device being connected via said source and drain electrodes in shunt with said receive signal path, and wherein said first limit of the control voltage corresponds to a threshold of conductance in said first and second field effect transistors and the second limit of the control voltage corresponds to a substantial enhancement of conductance in said first and second field effect transistors, whereby a disproportionately large transition from the receive mode of operation toward the transmit mode of operation is obtained with a partial transition in said control voltage from said first limit toward said second limit.

4. A voice switch as defined in claim 3 wherein said first, second, and third field effect transistors reside in a common substrate.

5. A voice switch as defined in claims 3 or 4 wherein said third field effect transistor is connected in series between a ground terminal and said first resistance via said source and drain electrodes respectively, said gate electrode being connected to the drain electrode and said first resistance being connected in series between the third field effect transistor and a voltage terminal, the means for generating said control voltage further comprising a control output connected to the gate electrodes of the first and second field effect transistors, a voltage follower circuit having an input connected to said voltage tap and an output connected via a second resistance to the control output to provide said first voltage, and switch means, responsive to said control signal being of a predetermined state, for providing a current path between the voltage terminal and said control output to cause said second voltage to appear at the control output.

6. A method for operating a hands free communication apparatus having variable resistance means provided by field effect devices in transmit and receive paths and a control circuit for generating a control signal in response to a.c. signals in a microphone circuit connected to the transmit path and a loudspeaker circuit connected to the receive path, the method including the steps of supplying an energizing voltage for operating the hands free communication apparatus; and generating a transmit signal state of said control signal corresponding to a transmit mode of operation, and a receive signal state corresponding to a receive mode of operation, wherein one of said signal states also corresponds to an idle mode of operation in the absence of significant a.c. signals in the microphone circuit and in the loudspeaker circuit, the method characterized by the further steps of:

conducting a current through a voltage divider having a field effect device with thermal operating characteristics substantially identical to the thermal operating characteristics of the field effect devices in said resistance means to develop a voltage at a first limit corresponding substantially to a threshold of conduction in said field effect devices;

controlling said field effect devices in the resistance means with a voltage substantially corresponding to said first limit to effect a mode of operation common with said idle mode and alternately controlling said field effect devices with a voltage at a second limit substantially corresponding to said energizing voltage to effect an opposite mode of operation;

whereby transitions from the idle mode of operation in the direction of the opposite mode of operation are rapid with respect to transition returning from said opposite mode of operation.

* * * * *